(12) United States Patent
Choi et al.

(10) Patent No.: US 10,616,290 B2
(45) Date of Patent: Apr. 7, 2020

(54) METHOD AND APPARATUS OF PROVIDING CHATROOMS FOR CONSULTATION

(71) Applicant: KAKAO CORP., Jeju-si, Jeju-do (KR)

(72) Inventors: Sung Hyun Choi, Seongnam-si (KR); Eun Joo Kim, Seongnam-si (KR); Hee Jin Lim, Seoul (KR); Eun Ha Ahn, Gwangju-si (KR); Mi Ok Kim, Seongnam-si (KR); Sol Ji Park, Yongin-si (KR); Sung Bum Hong, Uiwang-si (KR); Cheol Wong Kam, Seongnam-si (KR); Jeong Hyun Yang, Seongnam-si (KR)

(73) Assignee: KAKAO CORP., Jeju-Do (KR)

( * ) Notice: Subject to any disclaimer, the term of this patent is extended or adjusted under 35 U.S.C. 154(b) by 0 days.

(21) Appl. No.: 15/661,490

(22) Filed: Jul. 27, 2017

(65) Prior Publication Data
US 2018/0034866 A1 Feb. 1, 2018

(30) Foreign Application Priority Data
Jul. 27, 2016 (KR) .................. 10-2016-0095664

(51) Int. Cl.
*H04L 29/06* (2006.01)
*H04L 29/08* (2006.01)

(52) U.S. Cl.
CPC ............ *H04L 65/403* (2013.01); *H04L 67/02* (2013.01); *H04L 67/26* (2013.01); *H04L 67/306* (2013.01)

(58) Field of Classification Search
CPC ....... H04L 65/403; H04L 67/02; H04L 67/26; H04L 67/306

USPC ........................................................ 709/204
See application file for complete search history.

(56) References Cited

U.S. PATENT DOCUMENTS

| | | | | |
|---|---|---|---|---|
| 2005/0210113 A1* | 9/2005 | Kasuga | ............... | H04L 51/04 709/206 |
| 2007/0192474 A1* | 8/2007 | Decasper | ............... | G06Q 10/02 705/5 |
| 2009/0276728 A1* | 11/2009 | Doan | ............... | G06F 17/30876 709/206 |
| 2011/0161440 A1* | 6/2011 | Juvet | ............... | H04L 67/306 709/223 |
| 2012/0046011 A1* | 2/2012 | Thakur | ............... | G06Q 20/10 455/406 |
| 2012/0124485 A1* | 5/2012 | Scherpa | ............... | G06Q 10/10 715/753 |
| 2014/0041055 A1* | 2/2014 | Shaffer | ............... | G06Q 10/10 715/810 |

(Continued)

FOREIGN PATENT DOCUMENTS

| | | |
|---|---|---|
| KR | 10-2001-0095638 A | 11/2001 |
| KR | 10-2001-0102764 A | 11/2001 |

(Continued)

*Primary Examiner* — Meng Vang
(74) *Attorney, Agent, or Firm* — Cantor Colburn LLP

(57) ABSTRACT

Provided is an apparatus and method for providing a chatroom for consultation. The consultation chatroom providing apparatus generates an identification code by receiving consultation meta information and partner profile information from a partner server, generates a consultation chatroom by receiving the partner profile information and user information from a user terminal that scans or receives the identification code, and pushes information about the consultation chatroom to the user terminal.

16 Claims, 5 Drawing Sheets

(56) References Cited

U.S. PATENT DOCUMENTS

| 2016/0099892 | A1* | 4/2016  | Palakovich | H04L 51/04  |
|              |     |         |            | 709/206     |
| 2016/0180257 | A1* | 6/2016  | Rees       | G06Q 10/10  |
|              |     |         |            | 726/28      |
| 2016/0301771 | A1* | 10/2016 | Choudhari  | H04L 67/327 |
| 2017/0012950 | A1* | 1/2017  | Kim        | H04L 63/0442|

FOREIGN PATENT DOCUMENTS

| KR | 10-2002-0032536 A | 5/2002  |
| KR | 10-2005-0000963 A | 1/2005  |
| KR | 10-2013-0124115 A | 11/2013 |
| KR | 10-2016-0045189 A | 4/2016  |

* cited by examiner

METHOD AND APPARATUS OF PROVIDING CHATROOMS FOR CONSULTATION

CROSS-REFERENCE TO RELATED APPLICATION(S)

This application claims the priority benefit of Korean Patent Application No. 10-2016-0095664 filed on Jul. 27, 2016, in the Korean Intellectual Property Office, the disclosure of which is incorporated herein by reference for all purposes.

BACKGROUND

1. Field

One or more example embodiments relate to a method and apparatus for providing a chatroom for consultation.

2. Description of Related Art

With the developments in Internet technology, various types of customer services are provided through the Internet. However, consulting services are generally provided using a telephone due to user convenience for one-to-one connection between a customer and a consultant. Here, compared to a chatroom consultation, a telephone consultation does not readily allow a single consultant to proceed with a plurality of consultations at the same time and to transmit various types of data. In addition, a company is subject to bear the high cost of consulting services.

Accordingly, there is a need for technology that may enhance a user convenience to initiate a consulting service using a chatroom.

SUMMARY

According to an aspect of at least one example embodiment, there is provided a method of providing a chatroom for consultation, the method including receiving a first consultation request signal from a partner server; generating an identification code based on partner profile information and consultation meta information included in the first consultation request signal; receiving a second consultation request signal from a user terminal that scans or receives the identification code; generating a consultation chatroom based on the partner profile information that is acquired based on the second consultation request signal and user information that is included in the second consultation request signal; and pushing information about the consultation chatroom to the user terminal.

The first consultation request signal may be generated in response to a selection of a user on a consultation related user interface that is displayed on a webpage or an application interacting with the partner server.

The second consultation request signal may be generated in response to scanning or receiving the identification code using an instant message application installed on the user terminal.

The consultation room providing method may further include acquiring the consultation meta information from a database based on the second consultation request signal; and providing the acquired consultation meta information to an account corresponding to the partner profile information.

The identification code may include the consultation meta information and the partner profile information, or may include information about a location at which the consultation meta information and the partner profile information are stored, or may include key information corresponding to the consultation meta information and the partner profile information.

The consultation chatroom may be a chatroom in which a flag corresponding to a consultation is activated among a plurality of flags used to determine a type of a chatroom.

The partner profile information may include a partner account, and the user information may include a user account.

The consultation room providing method may further include generating charge information based on at least one of a display count of the identification code, a generation count of the consultation chatroom, and a chat history associated with the consultation chatroom.

The consultation room providing method may further include providing the consultation meta information, the user information, and consultation contents in the consultation chatroom to the partner server, in response to starting a chat reception and transmission in the consultation chatroom.

The consultation room providing method may further include displaying the identification code at a predetermined uniform resource locator (URL) address or a URL address included in the first consultation request signal.

The consultation room providing method may further include providing the identification code to the partner server. The identification code may be displayed on the user terminal by the partner server. The identification code may be in a form capable of being scanned or input by the user terminal.

According to an aspect of at least one example embodiment, there is provided an apparatus for providing a chatroom for consultation, the apparatus including a communication interface configured to receive a first consultation request signal from a partner server, to receive a second consultation request signal from a user terminal, and to push information about a consultation chatroom to the user terminal; and a processor configured to generate an identification code based on partner profile information and consultation meta information included in the first consultation request signal, and to generate consultation chatroom based on the partner profile information that is acquired based on the second consultation request signal and user information that is included in the second consultation request signal.

The first consultation request signal may be generated in response to a selection of a user on a consultation related user interface that is displayed on a webpage or an application interacting with the partner server.

The second consultation request signal may be generated in response to scanning or receiving the identification code using an instant message application installed on the user terminal.

The consultation chatroom providing apparatus may further include a memory configured to store the consultation meta information, the partner profile information, and the user information. The processor may be configured to acquire the consultation meta information from the memory based on the second consultation request signal, and the communication interface may be configured to provide the acquired consultation meta information to an account corresponding to the partner profile information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
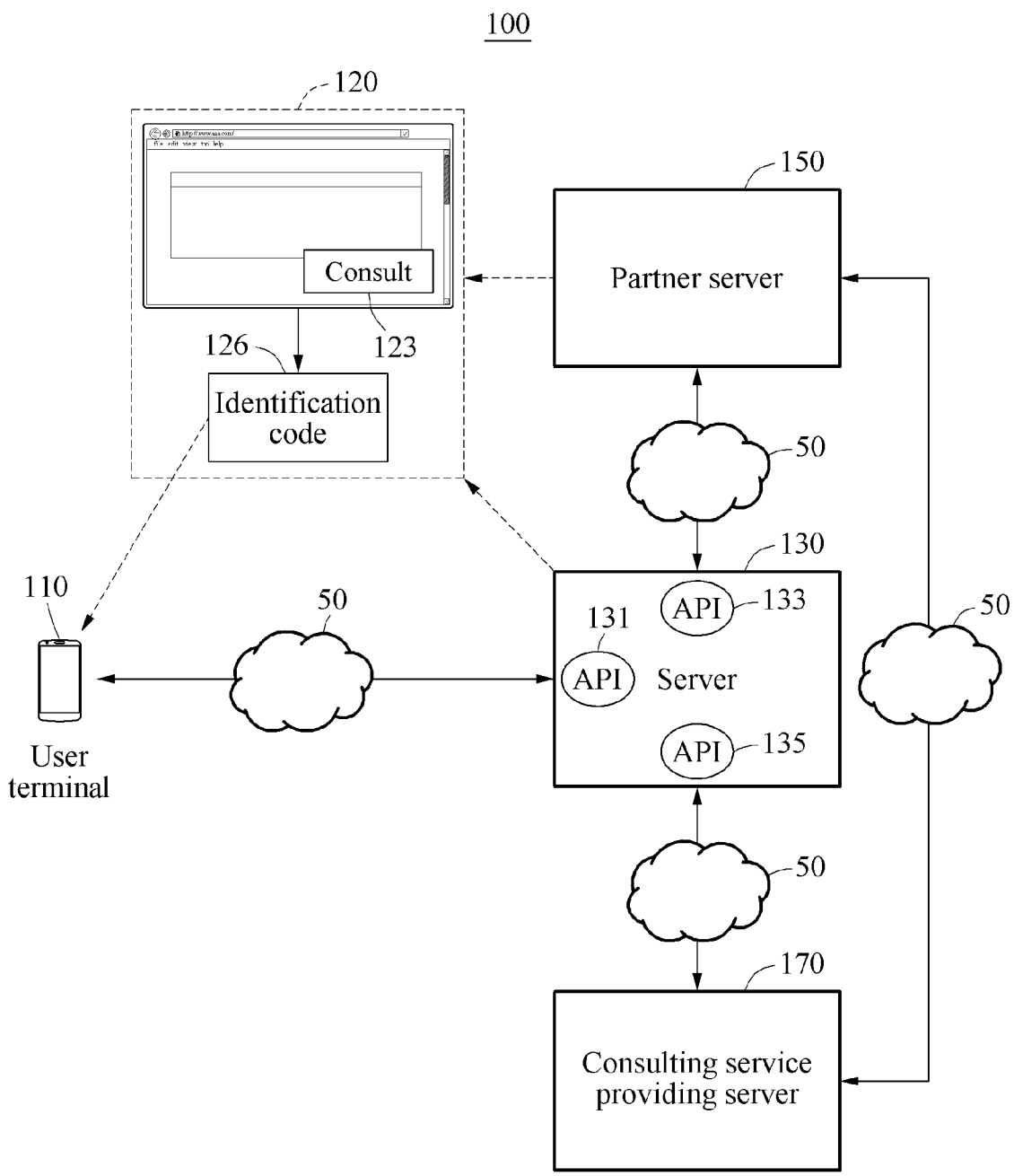
FIG. 1 is a diagram illustrating an example of a network environment in which a chatroom for consultation (also, referred to as a consultation chatroom) is provided according to an example embodiment.

Hereinafter, some example embodiments will be described in detail with reference to the accompanying drawings. It should be understood, however, that there is no intent to limit this disclosure to the particular example embodiments disclosed. On the contrary, example embodiments are to cover all modifications, equivalents, and alternatives falling within the scope of the example embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Also, regarding the reference numerals assigned to the elements in the drawings, it should be noted that the same elements will be designated by the same reference numerals, wherever possible, even though they are shown in different drawings. In the detailed description of well-known related structures or functions will be omitted when it is deemed that such description will cause ambiguous interpretation of the present disclosure.

FIG. 1 a diagram illustrating an example of a network environment in which a chatroom for consultation (also, referred to as a consultation chatroom) is provided according to an example embodiment. Referring to FIG. 1, a network environment 100 includes a user terminal 110, a server 130, a partner server 150, and a consulting service providing server 170. The user terminal 110, the server 130, the partner server 150, and the consulting service providing server 170 may be connected to one another over a network 50.

The user terminal 110 may be a terminal in which an instant message application capable of using a consultation chatroom is installed. The consultation chatroom may be provided from the server 130. The user terminal 110 may be at least one of, for example, a terminal, a personal computer (PC), a tablet computer, a smartphone, a personal digital assistant (PDA), a wearable device, a game device, and/or a learning device.

The server 130 may be an instant messaging server that provides a variety of services, such as an instant messaging service, a consulting service, an advertising service, a notification service, etc., to the user terminal 110, the partner server 150, and the consulting service providing server 170 over the network 50. The instant messaging service, the consulting service, the advertising service, and the notification service may be provided through various application programming interfaces (APIs) of the server 130.

The server 130 may provide the instant messaging service, the consulting service, the advertising service, and/or the notification service, etc., to the user terminal 110 through, for example, a user API 131. Also, the server 130 may provide the consulting service to the partner server 150 and the consulting service providing server 170 through a consultation API 135. Also, the server 130 may provide the advertising service, and/or the notification service to the partner server 150 through a company API 133.

The partner server 150 may be a server or a terminal of a company or an individual that makes a contract to be provided with the consulting service from the server 130. The partner server 150 may include a server or a terminal, etc., of, for example, an online shopping mall.

The consulting service providing server 170 may be a server or a terminal that relays the consulting service between a consultant terminal (not shown) of a partner and the server 130. For example, the consulting service providing server 170 may receive, from the server 130, chat consultation signals that target an account of the partner and may distribute the received chat consultation signals to consultant terminals of the partner. Also, the consulting service providing server 170 may match chat consultation signals received from the consultant terminals of the partner to the account of the partner and may transfer the chat consultation signals to the server 130.

According to an example embodiment, a module of the consulting service providing server 170 may be installed in the partner server 150. The consultant terminals of the partner may transmit and receive chat consultation signals through the module of the consulting service providing server 170 installed in the partner server 150. Although not illustrated, the module of the consulting service providing server 170 may be installed in each of the consultant terminals of the partner depending on example embodiments.

For clarity of description, FIG. 1 illustrates the consulting service providing server 170 and the partner server 150 to be separate from each other. However, it is provided as an example only. Depending on example embodiments, the consulting service providing server 170 may be included in the partner server 150.

The network 50 enables a wired/wireless communication between various entities included in the network environment 100. For example, the network 50 may use standard communication technology and/or protocols.

According to an example embodiment, the partner server 150 may display a consult button 123 through a webpage or an application 120. For example, the partner server 150 may display the consult button 123 through a webpage for a PC or may display the consult button 123 through a mobile webpage, or may display the consult button 123 through an exclusive application.

The consult button 123 may be displayed on the webpage or a screen associated with an advertising service, a product sales service, a customer inquiry service, and the like of the application 120. For example, if the partner is an online shopping mall, the consult button 123 may be displayed in association with a product that is recommended at the online shopping mall.

The user may select the consult button 123 that is displayed through the webpage or the application 120. In response to a selection of the user on the consult button 123 displayed through the webpage or the application 120, information for initiating the consulting service may be transmitted to the server 130.

For example, the partner server 150 may generate a first consultation request signal including consultation meta information and partner profile information that are predetermined to correspond to the consult button 123, and may transmit the first consultation request signal to the server 130. Here, the consultation meta information may be information about a product or a service that is linked with the consult button 123. Also, the partner profile information refers to information associated with a partner that performs a consultation with a user selecting the consult button 123, and may include, for example, account information used to identify the partner on the instant messaging service. Also, the partner profile information may further include a name, an address, a contact number, a representative name, etc., of the partner.

As another example, in response to a selection on the consult button 123 displayed through the exclusive application, the exclusive application may directly generate the first consultation request signal instead of the partner server 150 and may transmit the first consultation request signal to the server 130.

The server 130 may store the received consultation meta information and partner profile information. The server 130 may generate an identification code 126 based on the stored consultation meta information and partner profile information. The identification code 126 may include information about a location at which the consultation meta information and the partner profile information are stored, or may include the consultation meta information and the partner profile information. The identification code 126 may be provided in various forms, for example, a quick response (QR) code, a bar code, and the like. In the meantime, the consultation meta information may be converted to key information corresponding to the consultation meta information and thereby stored in the server 130. In this case, the identification code 126 may be generated based on the key information and the partner profile information. The key information refers to a value indicating the consultation meta information and may indicate a name of a container in which the consultation meta information is stored, order in which the consultation meta information is stored, and the like.

According to an example embodiment, when the consult button 123 is displayed using another terminal instead of using the user terminal 110, the identification code 126 may be displayed for the user in a form capable of being scanned by the user terminal 110. For example, the first consultation request signal generated in response to a selection on the consult button 123 may further include a URL address at which the identification code 126 is to be displayed. In this case, the server 130 may display the identification code 126 at the corresponding URL address. As another example, in response to the first consultation request signal, the server 130 may transmit the identification code 126 to the partner server 150. In this case, the partner server 150 may display the identification code 126 for the user using a website at which the consult button 123 is displayed or a separate website. As another example, in response to the first consultation request signal, the server 130 may display the identification code 126 at a specific URL address determined by the server 130.

The user may scan the identification code 126 using the user terminal 110. An identification code scanning function for initiating the consulting service may be provided to the instant message application installed in the user terminal 110. For example, the user may scan the identification code 126 using the identification code scanning function included in the instant message application of the user terminal 110.

As another example, when the consult button 123 is displayed on the user terminal 110, the identification code 126 may be displayed in a form capable of being input from the user.

The identification code 126 may be input to the instant message application using a variety of schemes. For example, the user may execute the instant message application and may directly input the identification code 126. As another example, the identification code 126 may be provided in a form that may be copied to a clipboard. In this case, the user may copy the identification code 126 to the clipboard and then may paste the identification code 126 to the instant message application. In this manner, the user may input the identification code 126 to the instant message application. As another example, a virtual key to which the identification code 126 is mapped may be displayed instead of displaying the identification code 126. In this case, in response to a selection of the user on the virtual key, the instant message application may be automatically executed and information about the identification code 126 may be provided to the instant message application.

Once the identification code 126 is scanned or input using the user terminal 110, a second consultation request signal is generated and transferred to the server 130. The second consultation request signal includes information about a location at which the consultation meta information and the partner profile information included in the identification code 126 are stored, or includes the consultation meta information and the partner profile information, or includes key information corresponding to the consultation meta information and the partner profile information. The second consultation request signal further includes user information.

The user information refers to information associated with a user that selects the consult button 123, and may include, for example, account information used to identify the user on the instant messaging service. The user information may further include user profile information, contents associated with the user, and the like. The user profile information may include, for example, a user account, a name, a contact number, a mail address, an age, a gender, an occupation, a hobby, a field of interest, etc., of the user. The contents associated with the user may include a photo (video) stored by the user and/or various multimedia contents.

The server 130 may generate a consultation chatroom based on the second consultation request signal. For example, the server 130 may acquire partner profile information and user information from the second consultation request signal. The server 130 may generate a consultation chatroom for chats between a partner account corresponding to the partner profile information and a user account corresponding to the user information.

The server 130 may transmit information about the consultation chatroom to the consulting service providing server 170. Depending on cases, a different consulting service providing server may be used for each partner. According to an example embodiment, the server 130 may store in advance information about a consulting service providing server 170 that provides a consulting service to a specific partner. Therefore, the server 130 may recognize the consulting service providing server 170 that maps a partner account and may transmit information about the consultation chatroom to the corresponding consulting service providing server 170. According to another example embodiment, the first consultation request signal may further include information about the consulting service providing server 170. In this case, the server 130 may acquire information about the consulting service providing server 170 corresponding to the partner account from the first consultation request signal, and may transmit information about the consultation chatroom to the corresponding consulting service providing server 170.

The consulting service providing server 170 may maintain a list of consultant terminals of the partner. In response to receiving a chat consultation signal with respect to the partner account, the consulting service providing server 170 may distribute the chat consultation signal to one terminal included in the list of consultant terminals of the partner. For example, the consulting service providing server 170 may sequentially select the consultant terminals of the partner in predetermined order. As another example, the consulting service providing server 170 may select a consultant terminal that includes a consultation history with the user terminal 110. In addition, a logic used for the consulting service providing server 170 to distribute the chat consultation signal may be variously modified.

In response to an input of a query message to the consultation chatroom from the user terminal 110, the server 130 may transfer the query message to the consulting service providing server 170. The consulting service providing server 170 may transfer the query message to a consultant terminal that is determined based on a distribution logic.

The consultant terminal may display the query message and may receive an answer message through an interface that interacts with the module of the consulting service providing server 170. In response to an input of the answer message from the consultant terminal, the consulting service providing server 170 may transfer the answer message to a corresponding consultation chatroom using the consultation API 135 of the server 130. The user terminal 110 may receive the answer message through the consultation chatroom.

According to the aforementioned operations, a consultation using chats may be performed between the consultant terminal of the partner and the user terminal 110.

In the meantime, the server 130 may acquire consultation meta information based on the second consultation request signal. For example, when the second consultation request signal includes a location at which the consultation meta information is stored, the server 130 may acquire the consultation meta information from the location. Alternatively, when the second consultation request signal includes the consultation meta information, the server 130 may acquire the consultation meta information from the second consultation request signal. Alternatively, when the second consultation request signal includes key information corresponding to the consultation meta information, the server 130 may acquire the consultation meta information corresponding to the key information from a database.

The server 130 may provide the consultation meta information to the consultant terminal of the partner through the consulting service providing server 170. The consultant terminal may recognize a product about which the user desires to consult based on the consultation meta information. Accordingly, quality of service (QoS) of the consulting service may be enhanced.

According to the aforementioned example embodiment, although the user does not have a "friend" relationship with the partner or a consultant of the partner at the instant messaging service, the user may use the chat consulting service with a professional consultant of the consulting service providing server 170 with respect to a desired consultation target.

In response to starting a chat reception and transmission between the user terminal 110 and the consulting service providing server 170 in the consultation chatroom, the server 130 may provide consultation meta information, user information, consultation contents, and the like, to the partner server 150. The partner server 150 may use information provided from the server 130 for a customer service.

Also, with the progress of a substantial consultation, the server 130 may charge the partner server 150 with fee according to providing of the consulting service. The server 130 may generate charge information based on at least one of, for example, a display count of the identification code 126, a generation count of the consultation chatroom, and a chat history associated with the consultation chatroom.

Figure 2:
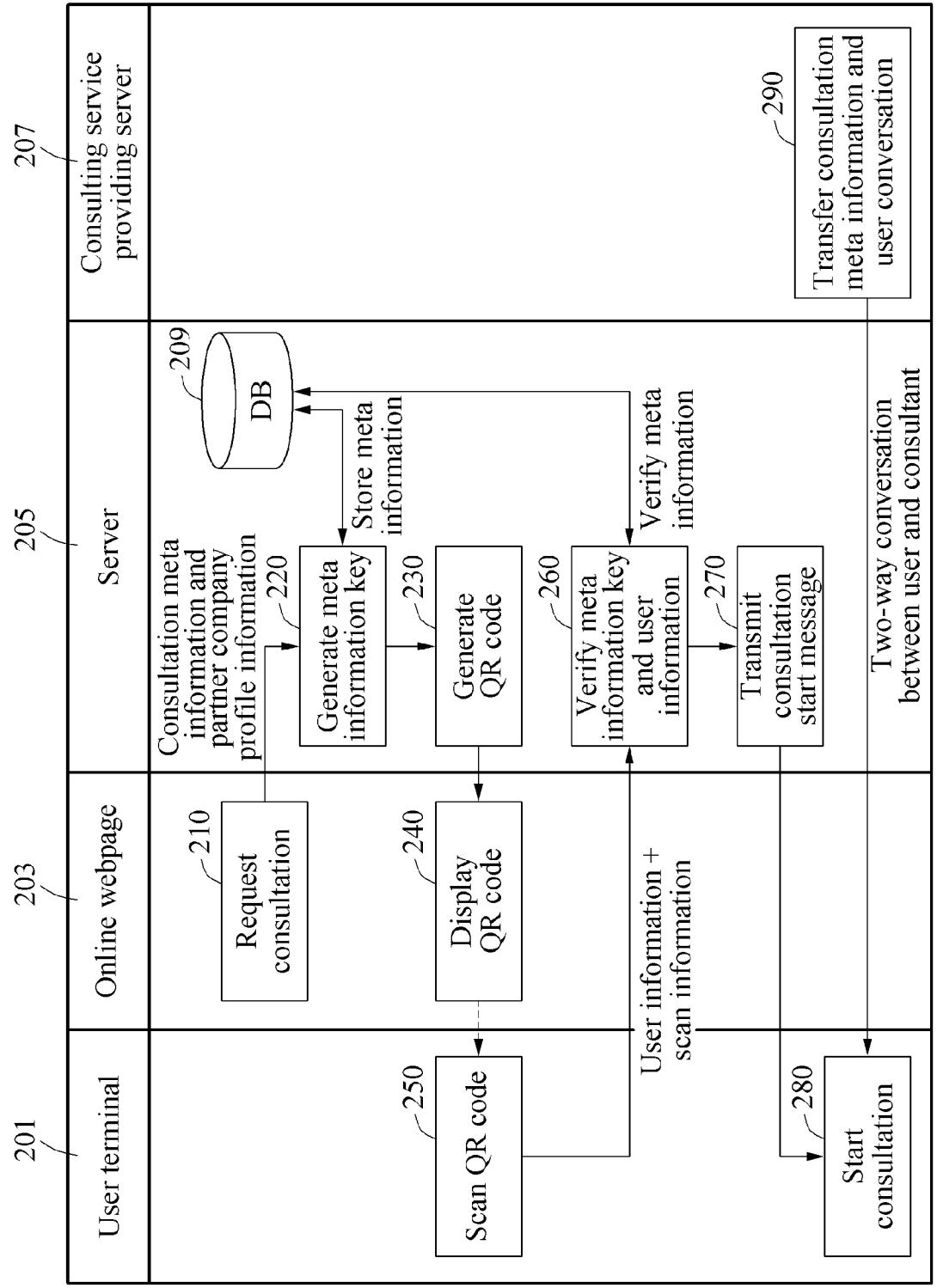
FIG. 2 is a diagram illustrating an example of a process of providing a consultation chatroom according to an example embodiment.

FIG. 2 is a diagram illustrating an example of a process of providing a consultation chatroom according to an example embodiment. FIG. 2 illustrates an operation performed between entities included in a network environment to provide the consultation chatroom.

Referring to FIG. 2, in operation 210, a user may connect to an online webpage 203 through a user terminal 201 or another terminal and may request a consultation. Here, the online webpage 203 may be that of a partner to which API technology for consultation provided from a server 205 is applied.

In response to the consultation request from the user, a server (not shown) of the partner may transmit a consultation request signal including consultation meta information and partner profile information to the server 205.

The consultation meta information may be information associated with a target that the user requests a consultation about, such as a product or a customer service provided from the partner. In particular, consultation meta information about the product may include product classification information or product configuration information. The product classification information may include information about a field or a category, for example, a travel service, food, baby products, and clothes, to which the consultation requested target belongs. Also, the product classification information may include information about detailed categories of each category, a product classification code, and the like. If the consultation requested product is a baby product, the product configuration information may include, for example, element(s) of the corresponding baby product, component(s) of each element, and the like. The partner profile information may include information about a partner account registered to the server 205.

In operation 220, the server 205 may generate a meta information key that is key information corresponding to the consultation meta information transmitted from the partner. The server 205 may store the consultation meta information and the meta information key in a database 209 or a storage.

In operation 230, the server 205 may generate an identification code, for example, a QR code based on the meta information key and the partner profile information. In operation 240, the generated QR code may be displayed through the online webpage 203.

In operation 250, the user may scan the QR code displayed on the online webpage 203 through the user terminal 201. In response thereto, user information and scan information may be transferred to the server 205. The user information may include account information and/or account authentication information of an instant message application of the user. The scan information may include the partner profile information and the meta information key.

In operation 260, the server 205 may verify the user information and the meta information key included in the scan information. The server 205 may verify the account information and/or the account authentication information of the instant message application of the user through the QR code. The server 205 may call the consultation meta information stored in the database 209 using the meta information key.

In operation 270, the server 205 may generate a consultation chatroom based on the pre-stored partner profile information and user information, and may transmit or push a consultation start message to the user terminal 201. For example, the server 205 may transmit the consultation start message to an account of the instant message application installed in the user terminal 201. The consultation start message may include an identifier of the consultation chatroom.

In operation 280, the user of the user terminal 201 may connect to the consultation chatroom using the account of the instant message application and may start the consultation that is provided from the consulting service providing server 207. During the consultation, the user of the user terminal 201 and the consultant of the consulting service providing server 207 may exchange various multimedia contents including images as well as texts.

A scenario in which a consult button is displayed not on the user terminal 201 but on the online webpage 203 of the other terminal, the QR code is used as the identification code, and the server 205 generates and manages the meta information key corresponding to the consultation meta information is described with reference to FIG. 2. As described with FIG. 1, the scenario of FIG. 2 may be modified to various scenarios, for example, a scenario of displaying the consult button through a webpage or an application of the user terminal 201, a scenario of using another type of code as the identification code instead of using the QR code, a scenario in which the server 205 manages the consultation meta information itself without generating the meta information key, and the like.

Figure 3:
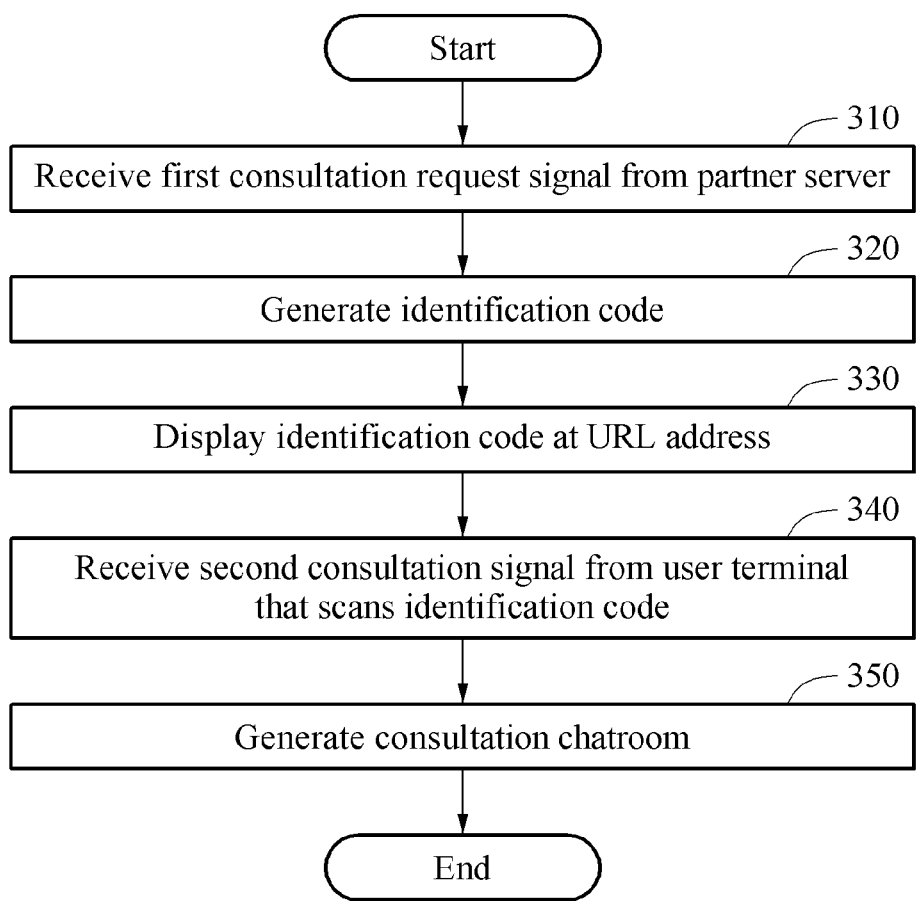
FIG. 3 is a flowchart illustrating an example of a method of providing a consultation chatroom according to an example embodiment.

FIG. 3 is a flowchart illustrating an example of a method of providing a consultation chatroom according to an example embodiment. Referring to FIG. 3, in operation 310, a server according to an example embodiment receives a first consultation request signal from a partner server. Here, the first consultation request signal may be generated in reaction to a selection of a user on a consultation related user interface, for example, a consult button, displayed on a webpage of the partner server. Consultation meta information may include information about, for example, a product or an advertising for which the consult button is selected. The first consultation request signal includes the consultation meta information and partner profile information.

In operation 320, the server generates an identification code based on key information corresponding to the consultation meta information and the partner profile information. The server may generate key information, for example, a meta information key, corresponding to the consultation meta information received in operation 310. The server may generate the identification code based on the key information and the partner profile information. The identification code may be a QR code that includes the key information corresponding to the consultation meta information and the partner profile information.

In operation 330, the server displays the identification code at a corresponding URL address. The URL address may be a URL address predetermined by the server or may be a URL address that is included in the first consultation request signal and thereby transferred, and that is provided from the partner server. Depending on example embodiments, the identification code may be provided to the partner server. An example embodiment in which the identification code is provided to the partner server is described with reference to FIG. 5.

In operation 340, the server receives a second consultation request signal from a user terminal that scans or receives the identification code displayed at the URL address. The second consultation request signal may be generated in response to scanning or receiving the identification code using the instant message application installed in the user terminal. The second consultation request signal includes key information, partner profile information, and user information.

In operation 350, the server generates a consultation chatroom based on the partner profile information and the user information. Here, the server may acquire the consultation meta information corresponding to the key information included in the second consultation request signal from a database, and may provide the acquired consultation meta information to an account corresponding to the partner profile information.

The server may transmit information about the consultation chatroom to a consulting service providing server or the user terminal. For example, the server may transmit an identifier of the consultation chatroom to the consulting service providing server or the user terminal and may notify the consulting service providing server or the user terminal that the consultation chatroom is generated.

The server may initiate, that is, start the consultation immediately with generation of the chatroom. Alternatively, the server may generate the chatroom and then may start the consultation in response to an input of a conversation from the user. Here, whether to start the consultation may be used as a condition for determining whether it is possible to converse with a consultant. For example, if the chatroom is generated and a conversation is not input from the user, the server determine that an actual consultation is not started and may disallow the consultant to input or proceed with a conversation prior to the user.

With the progress of the consultation through the consultation chatroom, the server may provide a consultation history to the partner server in association with, for example, a customer management, a charge, and the like. In detail, the server may generate charge information based on, for example, a display count of the identification code, a generation count of the consultation chatroom, and a chat history associated with the consultation chatroom. Every time the consultation chatroom is generated, the server may generate the charge information based on the generation count, that is, a number of times that the consultation chatroom is generated. Alternatively, when a chat reception and transmission history is generated a predetermined number of times or more in the consultation chatroom, for example, when a chat is received and transmitted once each time in the chatroom, the server may generate the charge information. If at least a minimum of a single user message and a single consultant message are transmitted and received by considering a conversation exchange, that is, a message exchange as an occurrence standard of a substantial chat consultation, the server may determine that the consultation chatroom is used and may generate the charge information. The server may manage a number of times that a chat is transmitted and received for each individual consultation chatroom, or may verify a number of consultation chatrooms in which a predetermined number of chats are transmitted and received during a day, that is, 24 hours and may charge a predetermined use fee.

The server may provide the generated charge information to the consulting service providing server or the partner server.

Figure 4:
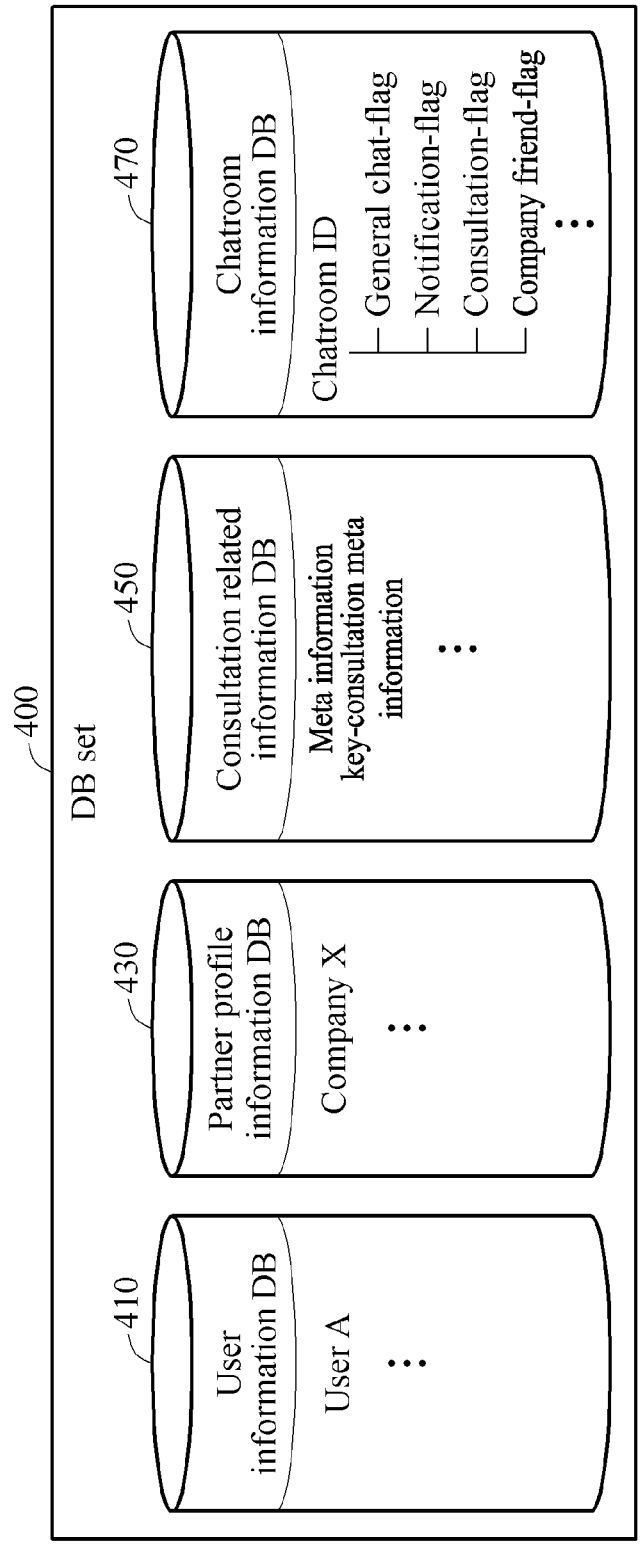
FIG. 4 is a diagram illustrating an example of a method of storing information in a database of a server according to an example embodiment.

FIG. 4 is a diagram illustrating an example of a method of storing information in a database of a server according to an example embodiment. FIG. 4 illustrates an example of information that a server maintains in a database set 400 and a storage type to provide a consultation chatroom.

Referring to FIG. 4, the database set 400 may include a user information DB 410, a partner profile information DB 430, a consultation related information DB 450, and a chatroom information DB 470.

The user information DB 410 may store the aforementioned user profile information. The user profile information may be information that is prepared by a user at the time of joining, for example, the instant message application. The user information DB 410 may include user information, for example, a user account, a name, a contact number, a mail address, an age, a gender, an occupation, a hobby, a field of interest, etc., of the user.

The partner profile information DB 430 may include a partner account, a name, an address, a contact number, a representative name, etc., of a partner.

The consultation related information DB 450 may include consultation meta information that is included in a consultation request signal of the user or the user terminal, or a meta information key that is key information generated in correspondence to the consultation meta information. The server may store the consultation meta information to be matched to the meta information key in the consultation related information DB 450.

According to an example embodiment, the chatroom information DB 470 may include a chatroom ID of the user, types of chatrooms joined by or available to the user, and flags corresponding to the chatrooms of the respective types. The chatrooms of the respective types may include, for example, a general chatroom, a notification chatroom, a consultation chatroom, a company friend chatroom, and the like. The chatroom ID of the user may be an account of the user registered to the instant message application. The chatroom ID of the user may be matched to the chatrooms joined by or available to the user and thereby stored.

A flag corresponding to each chatroom may be activated when the user joins chatrooms of the respective types or uses the corresponding chatrooms. For example, in response to scanning or receiving the identification code using the user terminal, the server may generate the consultation chatroom and accordingly, may activate a flag of the consultation chatroom stored in the chatroom information DB 470.

According to another example embodiment, the consultation chatroom may be generated in a form to be distinguished from a different type of a chatroom on an instant messaging service. In this case, a flag element of the consultation chatroom may be omitted in the chatroom information DB 470.

Depending on example embodiments, the server may set a chat to be available only when a friend relationship with the user is established for each type of each chatroom. Alternatively, although the friend relationship is established, the server may set a chat so that a user of a partner server or a consulting service providing server may not initiate a chat conversation and only the user of the user terminal may initiate a conversation. In addition, if a chat proceeds by using a rocket notification message or by joining or using a notification chatroom, a general chatroom, etc., the server may set a chat so that only the user of the user terminal may initiate a conversation.

Figure 5:
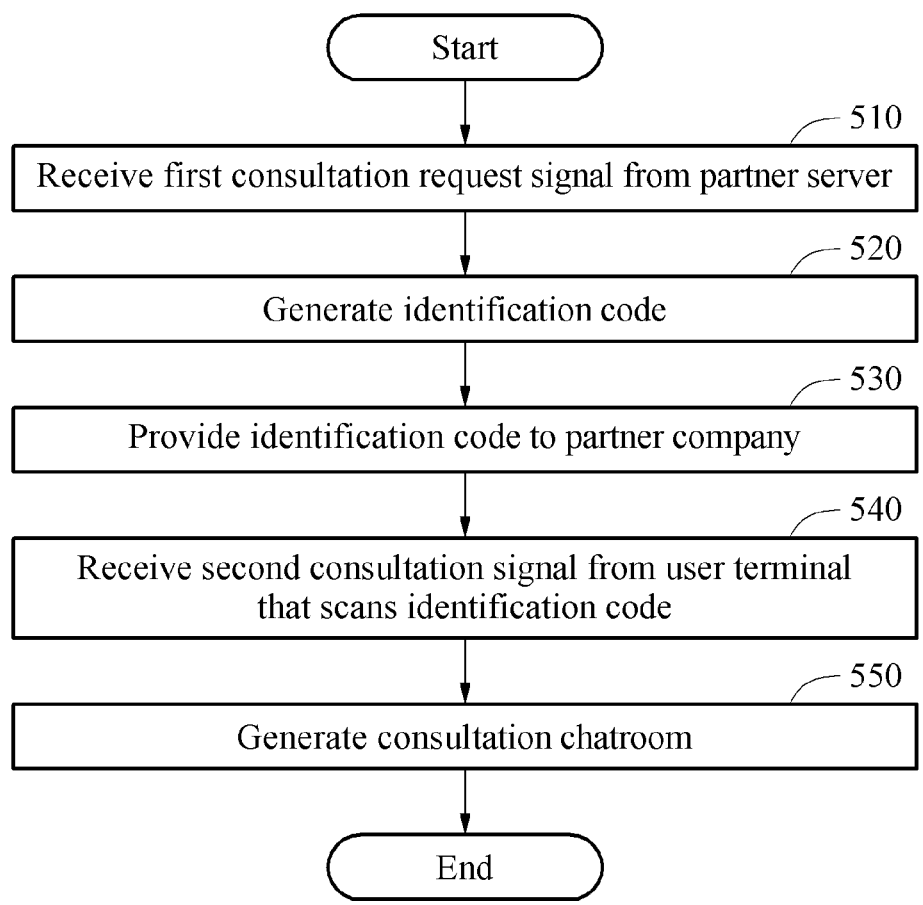
FIG. 5 is a flowchart illustrating another example of a method of providing a consultation chatroom according to an example embodiment.

FIG. 5 is a flowchart illustrating another example of a method of providing a consultation chatroom according to an example embodiment. Referring to FIG. 5, in operation 510, a server according to an example embodiment receives a first consultation request signal from a partner server. The first consultation request signal includes consultation meta information and partner profile information.

In operation 520, the server generates an identification code based on key information corresponding to the consultation meta information and the partner profile information. In operation 530, the server provides the identification code to the partner server. The identification code may be displayed through a homepage, etc., of the partner server by the partner server. The identification code may be displayed in a form capable of being scanned by a user terminal.

In operation 540, the server receives a second consultation request signal from a user terminal that scans or receives the identification code. The second consultation request signal includes key information, partner profile information, and user information. In operation 550, the server generates a consultation chatroom based on the partner profile information and the user information.

The server may transmit information about the consultation chatroom to a consulting service providing server or the user terminal. For example, the server may transmit an identifier of the consultation chatroom to the consulting service providing server or the user terminal and may notify the consulting service providing server or the user terminal that the consultation chatroom is generated.

A server that provides a consultation chatroom according to an example embodiment includes a communication interface, a processor, and a memory. The communication interface, the processor, and the memory may be connected to each other through a communication bus for interconnection between components. The communication bus may include a circuit that controls communication between components of a system and interconnects the components.

The server may be, for example, a single server computer or a system similar thereto, or may be a plurality of servers that are arranged using one or more server banks or other alignments. The server may be placed in a single facility or may be a server cloud in which a plurality of servers are distributed at many geographically discrete locations.

The communication interface enables communication with other devices through a single communication network. The communication interface receives a first consultation request signal from the partner server. The processor generates an identification code based on partner profile information and consultation meta information included in the first consultation request signal.

The communication interface receives a second consultation request signal from a user terminal that scans or receives the identification code. The processor generates a consultation chatroom based on the partner profile information that is acquired from the second consultation request signal and the user information that is included in the second consultation request signal. The communication interface pushes information about the consultation chatroom to the user terminal.

The memory may include high-speed random access memory, such as, for example, dynamic random access memory (DRAM), static RAM (SRAM), double data rate (DDR) RAM, or other high-speed access static state memory devices, and the like. The memory may include a non-volatile memory, such as, for example, at least one magnetic disk storage device, optical disc storage device, flash memory device, or other non-volatile static state storage devices, and the like. The memory may selectively include at least one storage device that is located at a remote location from the processor.

The processor may acquire consultation meta information from a database stored in the memory, based on the second consultation request signal. The processor may provide the acquired consultation meta information to an account corresponding to the partner profile information.

The aforementioned example embodiments may be configured using hardware components, software components, and/or combination of hardware components and software components. For example, the apparatuses, the methods, and the components described in the example embodiments may be configured using one or more general-purpose or special purpose computers, such as, for example, a processor, a controller, a central processing unit (CPU), a graphics processing unit (GPU), an arithmetic logic unit (ALU), a digital signal processor, a microcomputer, a field programmable gate array (FPGA), a programmable logic unit (PLU), a microprocessor, an application specific integrated circuit (ASICS), or any other device capable of responding to and executing instructions in a defined manner.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A method of providing a chatroom for consultation, the method comprising:
   receiving, for an instant messaging server which provides an instant messaging service through an instant message application, a first consultation request signal from a partner server which provides the consultation;
   generating, for the instant messaging server, an identification code based on partner profile information and consultation meta information included in the first consultation request signal;
   receiving, for the instant messaging server, a second consultation request signal from a user terminal that scans or receives the identification code;
   generating, for the instant messaging server, a consultation chatroom based on the partner profile information that is acquired based on the second consultation request signal and user information that is included in the second consultation request signal; and
   transmitting, for the instant messaging server, information about the consultation chatroom to the user terminal and the partner server,
   wherein the instant messaging server is a different server from the partner server, and the user terminal is configured to install the instant message application capable of using the consultation chatroom therein, and
   wherein the user information is included in the second consultation request signal in response to scanning or receiving the identification code at the user terminal, the user information comprising at least one of account information and account authentication information of the instant message application of the user terminal, and the identification code being displayed on a different device from the user terminal.

2. The method of claim 1, wherein the first consultation request signal is generated in response to a selection of a user on a consultation related user interface that is displayed on a webpage or an application interacting with the partner server.

3. The method of claim 1, wherein the second consultation request signal is generated in response to scanning or receiving the identification code using the instant message application installed on the user terminal.

4. The method of claim 1, further comprising:
   acquiring, for the instant messaging server, the consultation meta information based on the second consultation request signal; and
   providing, for the instant messaging server, the acquired consultation meta information to an account corresponding to the partner profile information,
   wherein the consultation meta information includes information about a product or a service that is linked with the consultation related user interface that is displayed on the webpage or the application interacting with the partner server.

5. The method of claim 4, wherein the identification code comprises the consultation meta information and the partner profile information, or comprises information about a location at which the consultation meta information and the partner profile information are stored, or comprises key information corresponding to the consultation meta information and the partner profile information.

6. The method of claim 1, wherein the consultation chatroom is a chatroom in which a flag indicating that a type of the chatroom is a consultation is activated among a plurality of flags used to determine a type of a chatroom.

7. The method of claim 1, wherein the partner profile information comprises a partner account used to identify the partner on the instant messaging service, and the user information comprises a user account registered to the instant message application, and used to identify the user on the instant messaging service.

8. The method of claim 1, further comprising:

generating, for the instant messaging server, charge information based on at least one of a display count of the identification code, a generation count of the consultation chatroom, and a chat history associated with the consultation chatroom.

9. The method of claim 1, further comprising:

providing, for the instant messaging server, the consultation meta information, the user information, and consultation contents in the consultation chatroom to the partner server, in response to starting a chat reception and transmission in the consultation chatroom.

10. The method of claim 1, further comprising:

displaying, for the instant messaging server, the identification code at a predetermined uniform resource locator (URL) address or a URL address included in the first consultation request signal.

11. The method of claim 1, further comprising:

providing, for the instant messaging server, the identification code to the partner server, wherein the identification code is displayed on the user terminal by the partner server.

12. A non-transitory computer-readable medium storing instructions that, when executed by an instant messaging server which provides an instant messaging service through an instant message application, cause the instant messaging server to perform;

receiving a first consultation request signal from a partner server which provides the consultation;

generating an identification code based on partner profile information and consultation meta information included in the first consultation request signal;

receiving a second consultation request signal from a user terminal that scans or receives the identification code;

generating a consultation chatroom based on the partner profile information that is acquired based on the second consultation request signal and user information that is included in the second consultation request signal; and transmitting information about the consultation chatroom to the user terminal and the partner server, wherein the instant messaging server is a different server from the partner server, and the user terminal is configured to install the instant message application capable of using the consultation chatroom therein, and wherein the user information is included in the second consultation request signal in response to scanning or receiving the identification code at the user terminal, the user information comprising at least one of account information and account authentication information of the instant message application of the user terminal, and the identification code being displayed on a different device from the user terminal.

13. An apparatus for providing a chatroom for consultation, the apparatus comprising:

a communication interface configured to receive a first consultation request signal from a partner server which provides the consultation, to receive a second consultation request signal from a user terminal, and to transmit information about a consultation chatroom to the user terminal and the partner server; and a processor configured to generate an identification code based on partner profile information and consultation meta information included in the first consultation request signal, and to generate the consultation chatroom based on the partner profile information that is acquired based on the second consultation request signal and user information that is included in the second consultation request signal, wherein the apparatus is a different apparatus from the partner server and provides an instant messaging service through an instant message application, and the user terminal is configured to install the instant message application capable of using the consultation chatroom therein, and wherein the user information is included in the second consultation request signal in response to scanning or receiving the identification code at the user terminal, the user information comprising at least one of account information and account authentication information of the instant message application of the user terminal, and the identification code being displayed on a different device from the user terminal.

14. The apparatus of claim 13, wherein the first consultation request signal is generated in response to a selection of a user on a consultation related user interface that is displayed on a webpage or an application interacting with the partner server.

15. The apparatus of claim 13, wherein the second consultation request signal is generated in response to scanning or receiving the identification code using the instant message application installed on the user terminal.

16. The apparatus of claim 13, further comprising:

a memory configured to store the consultation meta information, the partner profile information, and the user information, wherein the processor is configured to acquire the consultation meta information from the memory based on the second consultation request signal, the communication interface is configured to provide the acquired consultation meta information to an account corresponding to the partner profile information, and the consultation meta information includes information about a product or a service that is linked with the consultation related user interface that is displayed on the webpage or the application interacting with the partner server.

* * * * *